United States Patent
Botu et al.

(10) Patent No.: US 11,834,368 B2
(45) Date of Patent: Dec. 5, 2023

(54) LOW TEMPERATURE MOLDABLE SHEET FORMING GLASS COMPOSITIONS

(71) Applicant: CORNING INCORPORATED, Corning, NY (US)

(72) Inventors: Venkatesh Botu, Corning, NY (US); Matthew John Dejneka, Corning, NY (US); Nadja Teresia Lönnroth, Helsinki (FI); Adama Tandia, Corning, NY (US); Kochuparambil Deenamma Vargheese, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/098,262

(22) Filed: Jan. 18, 2023

(65) Prior Publication Data
US 2023/0150862 A1 May 18, 2023

Related U.S. Application Data

(62) Division of application No. 17/056,593, filed as application No. PCT/US2019/032897 on May 17, 2019, now Pat. No. 11,591,255.

(51) Int. Cl.
*C03C 3/091* (2006.01)
*C03C 3/093* (2006.01)

(52) U.S. Cl.
CPC .............. *C03C 3/093* (2013.01); *C03C 3/091* (2013.01)

(58) Field of Classification Search
CPC ................................ C03C 3/091; C03C 3/093
See application file for complete search history.

(56) References Cited

U.S. PATENT DOCUMENTS

| | | |
|---|---|---|
| 4,418,985 A | 12/1983 | Kasori et al. |
| 4,565,791 A | 1/1986 | Boudot et al. |
| 7,566,673 B2 | 7/2009 | Kawai |
| 7,595,273 B2 | 9/2009 | Ikenishi et al. |
| 8,697,592 B2 | 4/2014 | Ikenishi et al. |
| 10,131,567 B2 | 11/2018 | Beall et al. |
| 11,136,258 B2 | 10/2021 | Dejneka et al. |
| 2007/0264533 A1 | 11/2007 | Tsuda et al. |
| 2009/0298669 A1 | 12/2009 | Akiba et al. |
| 2010/0029460 A1 | 2/2010 | Shojiya et al. |
| 2010/0093510 A1 | 4/2010 | Tanaka et al. |
| 2010/0255350 A1 | 10/2010 | Endo et al. |
| 2011/0294649 A1 | 12/2011 | Gomez et al. |
| 2012/0052271 A1 | 3/2012 | Gomez et al. |
| 2015/0239770 A1 | 8/2015 | Gross |
| 2018/0022638 A1 | 1/2018 | Comte et al. |

FOREIGN PATENT DOCUMENTS

| | | |
|---|---|---|
| EP | 3392220 A1 | 10/2018 |
| JP | 2001-019466 A | 1/2001 |
| JP | 2001-213633 A | 8/2001 |
| JP | 2002-338297 A | 11/2002 |
| WO | 2019/089602 A1 | 5/2019 |

OTHER PUBLICATIONS

International Search Report and Written Opinion of the International Searching Authority; PCT/US2019/032897; dated Oct. 2, 2019; 9 Pages; European Patent Office.

*Primary Examiner* — Karl E Group

(57) ABSTRACT

The embodiments described herein relate to low temperature moldable sheet forming glass compositions and glass articles formed from the same. In various embodiments, the glass composition comprises from about 60 mol. % to about 67 mol. % $SiO_2$, from about 6 mol. % to about 11 mol. % $B_2O_3$, from about 4.5 mol. % to about 11 mol. % $Li_2O$, $Al_2O_3$, $Na_2O$, and $K_2O$. The glass composition also includes greater than about 2 mol. % RO, where RO are divalent metal oxides, and $R_2O$ from about 14 mol. % to about 20 mol. %, where $R_2O$ are alkali metal oxides. The glass composition also has a glass transition temperature $T_g$ of less than about 500° C., a softening point of less than about 650° C., and a coefficient of thermal expansion (CTE) of less than about $85\times10^{-7}K^{-1}$.

10 Claims, No Drawings

LOW TEMPERATURE MOLDABLE SHEET FORMING GLASS COMPOSITIONS

CROSS-REFERENCE TO RELATED APPLICATIONS

This application is a divisional of U.S. patent application Ser. No. 17/056,593 filed on Nov. 18, 2020, which claims the benefit of priority under 35 U.S.C. § 371 of International Application No. PCT/US2019/032897, filed on May 17, 2019, which claims the benefit of priority under 35 U.S.C. § 119 of U.S. Provisional Application No. 62/674,739, filed May 22, 2018, the content of each of which is incorporated herein by reference in its entirety.

BACKGROUND

Field

The present specification generally relates to glass compositions and, more specifically, to low temperature moldable sheet forming glass compositions.

Technical Background

In order to mold or reform glass to a three-dimensional shape, the softening point of the glass needs to be considerably low. In particular, to minimize tool wear and to enable pressing or molding to happen without a protective atmosphere, the temperature at which the glass deforms should be less than about 650° C. Depending on the particular type of reforming method used, pressure can be utilized to form at higher viscosities, and the forming can be made at around the softening point ($10^{7.6}$ poise) or at higher viscosities.

Accordingly, a need exists for glass compositions that have sheet forming attributes and have a low softening point such that it can be molded at low temperatures after sheet formation.

SUMMARY

According to one embodiment, a glass composition comprises from about 60 mol. % to about 67 mol. % $SiO_2$, from about 6 mol. % to about 11 mol. % $B_2O_3$, from about 4.5 mol. % to about 11 mol. % $Li_2O$, $Al_2O_3$, $Na_2O$, and $K_2O$. The glass composition also includes greater than about 2 mol. % RO, where RO are divalent metal oxides, and $R_2O$ from about 14 mol. % to about 20 mol. %, where $R_2O$ are alkali metal oxides. The glass composition also has a glass transition temperature $T_g$ of less than about 500° C. and a coefficient of thermal expansion (CTE) of less than about $90\times10^{-7}K^{-1}$.

According to another embodiment, a glass composition comprises from about 60 mol. % to about 67 mol. % $SiO_2$, from about 6 mol. % to about 11 mol. % $B_2O_3$, from about 4.5 mol. % to about 11 mol. % $Li_2O$, $Al_2O_3$, from about 5 mol. % to about 9.4 mol. % $Na_2O$, $K_2O$, from about 0 mol. % to about 1.5 mol. % CaO, from about 0 mol. % to about 6 mol. % MgO, from about 0 mol. % to about 2 mol. % SrO, from about 0 mol. % to about 2 mol. % BaO, and from about 0 mol. % to about 4.5 mol. % ZnO. The glass composition comprises greater than about 2 mol. % RO, where RO are divalent metal oxides. Additionally, $R_2O$ is from about 14 mol. % to about 20 mol. %, where $R_2O$ are alkali metal oxides. The glass composition also has a coefficient of thermal expansion (CTE) of less than about $90\times10^{-7}K^{-1}$.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to various embodiments of glass compositions which exhibit low softening points and desired CTE. Such glass compositions are suitable for use in various applications including, without limitation, formation of three-dimensional glass articles. The glass compositions described herein may generally comprise silica ($SiO_2$), alumina ($Al_2O_3$), boron oxide ($B_2O_3$), alkaline earth oxides (such as MgO, CaO, SrO, BaO, and/or ZnO), and alkali oxides (such as $Li_2O$, $Na_2O$, and/or $K_2O$) in amounts which lower the softening point without raising the CTE to an undesirable level. Various embodiments of the glass compositions will be described herein and further illustrated with reference to specific examples.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "softening point," as used herein, refers to the temperature at which the viscosity of the glass composition is $1\times10^{7.6}$ poise.

The term "annealing temperature," or "$T_{anneal}$," as used herein, refers to the temperature at which the viscosity of the glass composition is $1 \times 10^{13.18}$ poise, as measured by beam bending methos.

The terms "strain point" and "$T_{strain}$" as used herein, refers to the temperature at which the viscosity of the glass composition is $10^{14.68}$ poise, as measured by beam bending method.

The term "CTE," as used herein, refers to the coefficient of thermal expansion of the glass composition over a temperature range from about room temperature (RT) to about 300° C., measured by dilatometry with data taken from the cooling curve.

As used herein, the term "liquidus viscosity" refers to the viscosity of a molten glass at the liquidus temperature, wherein the liquidus temperature refers to the temperature where the first crystals appear into the melt, measured by gradient boat method in at the hot end of a tube furnace.

In the embodiments of the glass compositions described herein, the concentrations of constituent components (e.g., $SiO_2$, $Al_2O_3$, and the like) are specified in mole percent (mol. %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol. %.

The glass compositions described herein are alkali aluminosilicate glass compositions which may generally include a combination of $SiO_2$ and one or more alkali oxides, such as $Li_2O$, $Na_2O$ and/or $K_2O$. The glass composition may also include $Al_2O_3$, $B_2O_3$, and at least one divalent metal oxide. The glass compositions are resistant to chemical degradation and are also suitable for chemical strengthening by ion exchange. In some embodiments the glass compositions may further comprise minor amounts of one or more additional oxides such as, for example, $SnO_2$, $ZrO_2$, ZnO, $Sb_2O_3$, $Cl^-$, $CeO_2$, or the like. These components may be added as fining agents and/or to further enhance the chemical durability of the glass composition.

In the embodiments of the glass compositions described herein $SiO_2$ is the largest constituent of the composition and, as such, is the primary constituent of the resulting glass network. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. However, if the content of $SiO_2$ is too high, the softening point is above 650° C. In the embodiments described herein, the glass composition generally comprises $SiO_2$ in an amount greater than or equal to 60 mol. % and less than or equal to about 67 mol. %. In some embodiments, the glass composition includes from about 61 mol. % to about 65 mol. % or even from about 62.5 mol. % to about 65 mol. % $SiO_2$.

The glass compositions described herein further includes $Al_2O_3$. $Al_2O_3$, in conjunction with alkali oxides present in the glass compositions such as $Na_2O$ or the like, reduces the phase separation of the glass. In the embodiments described herein, $Al_2O_3$ is present in the glass compositions in X mol. % while the alkali oxides are present in the glass composition in Y mol. %. The ratio Y:X in the glass compositions described herein is greater than 1. In other words, in various embodiments, $R_2O$ (mol. %)>$Al_2O_3$ (mol. %). Specifically, as the ratio of Y:X increases, the strain point, anneal point, and softening point of the glass decrease, such that the glass is more readily formable.

However, if the amount of $Al_2O_3$ in the glass composition is too high, the softening point of the glass increases. Accordingly, the glass compositions described herein generally include $Al_2O_3$ in an amount greater than or equal to about 2.5 mol. % and less than or equal to about 7.5 mol. %. In some embodiments, the glass composition includes from about 3 mol. % to about 7 mol. % $Al_2O_3$, or even from about 3.5 mol. % to about 5.5 mol. % $Al_2O_3$.

Boron oxide ($B_2O_3$) is a flux which may be added to glass compositions to reduce the viscosity at a given temperature (e.g., the strain, anneal and softening temperatures) thereby improving the formability of the glass. $B_2O_3$ also helps scavenge non-bridging oxygen atoms (NBOs), converting the NBOs to bridging oxygen atoms through the formation of $BO_4$ tetrahedra, which increases the toughness of the glass by minimizing the number of weak NBOs. $B_2O_3$ also lowers the hardness of the glass which, when coupled with the higher toughness, decreases the brittleness, thereby resulting in a mechanically durable glass. Accordingly, the glass compositions described herein generally include $B_2O_3$ in an amount greater than or equal to about 6 mol. % and less than or equal to about 11 mol. %. In some embodiments, the glass composition includes from about 7 mol. % to about 10 mol. % or even from about 8 mol. % to about 9 mol. % $B_2O_3$.

The glass compositions also include one or more alkali oxides such as $Li_2O$, $Na_2O$, and/or $K_2O$. The alkali oxides facilitate the softening and melting of the glass, enable ion exchange, decreases melt resistivity, and breaks up the glass network, which increases thermal expansion and decreases durability. Mixtures of alkali metal oxides also help depress the liquidus temperature. The alkali oxide may include one or more of $Li_2O$, $Na_2O$, and $K_2O$. The alkali oxides are generally present in the glass composition in a total concentration of Y mol. %. In some embodiments described herein, Y may be greater than about 14 mol. % and less than or equal to about 20 mol. %. For example, Y may be from about 15 mol. % to about 20 mol. %, or even from about 17.5 mol. % to about 20 mol. %.

In some embodiments, the alkali oxide in the glass composition comprises $Li_2O$. Including $Li_2O$ in the glass composition decreases the softening point of the glass. In embodiments where the alkali oxide includes $Li_2O$, the $Li_2O$ may be present in an amount greater than or equal to about 4.5 mol. % and less than or equal to about 11 mol. %. In some embodiments, the glass composition may include from about 8 mol. % to about 10.5 mol. % or even from about 9 mol. % to about 10.5 mol. % $Li_2O$.

The alkali oxide $Na_2O$ is used to further soften the glass. Accordingly, in the embodiments of the glass compositions described herein, the alkali oxide present in the glass composition includes at least $Na_2O$. Specifically, in order to achieve the desired softening while not increasing the CTE to an undesirable level, the glass compositions include $Na_2O$ in an amount from about 5 mol. % to about 9.4 mol. % based on the molecular weight of the glass composition. In some embodiments, the glass composition may include from about 5 mol. % to about 7 mol. %, or even from about 5.5 mol. % to about 6.5 mol. % $Na_2O$. In other embodiments, the glass composition may include from about 8 mol. % to about 9.4 mol. % or from about 8.5 mol. % to about 9 mol. %. Additionally, it is desirable to limit the levels of $Na_2O$ because when levels of $Na_2O$ are high and the amount of $Al_2O_3$ is greater than 5 mol. %, albite will form easily, and the liquidus temperature increases to above 800° C.

As noted above, the alkali oxide in the glass composition may further include $K_2O$. The amount of $K_2O$ present in the glass composition also relates to the softening of the glass composition. Specifically, like with $Na_2O$, as the amount of $K_2O$ present in the glass composition increases, the CTE also increases. Accordingly, it is desirable to limit the amount of $K_2O$ present in the glass composition. In some embodiments, the amount of $K_2O$ is greater than or equal to 1 mol. % and less than or equal to 5 mol. %. In embodiments, the glass composition may include from about 1.5 mol. % to about 2.5 mol. % or even from about 1.75 mol. % to about 2 mol. %.

Divalent metal oxides may be present in the composition to decrease the softening point of the glass composition and help create a steeper viscosity curve for the glasses. In the glass compositions described herein, the total mol. % of divalent metal oxides (RO) present in the glass compositions is generally greater than about 1 mol. % or even greater than about 2 mol. %. In some of these embodiments, the amount of divalent metal oxide in the glass composition may be from about 4 mol. % to about 8 mol. % or even from about 4 mol. % to about 7 mol. %.

In various embodiments described herein, the glass compositions include high amount of modifiers to soften the glass. Accordingly, the glass compositions generally include a total mol. % of divalent metal oxides and alkali oxides ($RO+R_2O$) that is greater than or equal to about 20 mol. % and less than or equal to about 28 mol. %. In some embodiments, the glass composition includes from about 21 mol. % to about 26 mol. % or even from about 22 mol. % to about 23 mol. % of divalent metal oxides and alkali oxides.

The divalent metal oxide in the glass composition may include MgO, CaO, SrO, BaO, ZnO, or combinations thereof. In some embodiments, the divalent metal oxide includes MgO, CaO or combinations thereof. For example, in the embodiments described herein the divalent metal oxide includes MgO. However, large amounts of MgO tend to increase the liquidus temperature, as the oxide is prone to form forsterite ($Mg_2SiO_4$) at low MgO concentrations in sodium aluminosilicate glasses. Accordingly, in some embodiments, MgO is present in the glass composition in an amount which is greater than or equal to about 0 mol. % and less than or equal to about 6 mol. % MgO. In embodiments, the glass composition may include from about 0.5 mol. % to about 2 mol. % or even from about 0.75 mol. % to about 1.25 mol. % MgO.

In some embodiments, the divalent metal oxide may further include CaO. In these embodiments CaO is present in the glass composition in an amount from about 0 mol. % to less than or equal to 1.5 mol. % by molecular weight of the glass composition. For example, the amount of CaO present in the glass composition may be less than or equal to 1.5 mol. %, less than or equal to 1 mol. %, or less than or equal to 0.5 mol. %. In some of these embodiments, CaO may be present in the glass composition in an amount greater than or equal to about 0.1 mol. % and less than or equal to about 1.0 mol. %. For example, CaO may be present in the glass composition in an amount greater than or equal to about 0.2 mol. % and less than or equal to about 0.7 mol. % or even in an amount greater than or equal to about 0.3 mol. % and less than or equal to about 0.6 mol. %.

In embodiments, the total amount of MgO and CaO in the glass composition is less than or equal to about 6 mol. %. For example, in embodiments, the glass composition includes from about 0.01 mol. % to about 2.25 mol. % or even from about 0.9 mol. % to about 2.1 mol. % MgO and CaO.

In some embodiments, the divalent metal oxide may further include ZnO. In such embodiments, the glass composition may include ZnO in an amount greater than or equal to 1 mol. % and less than or equal to about 4.5 mol. %. For example, the ZnO may be present in an amount of from about 2 mol. % to about 4.5 mol. %, or even from about 2.5 mol. % to about 4.0 mol. %. However, it should be understood that in some embodiments, ZnO is not included in the glass composition.

In the embodiments described herein, the glass compositions are generally rich in MgO, (i.e., the concentration of MgO in the glass composition is greater than the concentration of the other divalent metal oxides in the glass composition including, without limitation, CaO). Forming the glass composition such that the glass composition is MgO-rich improves the hydrolytic resistance of the resultant glass.

In addition to the $SiO_2$, $Al_2O_3$, alkali oxides and divalent metal oxides, the glass compositions described herein may optionally further comprise one or more fining agents such as, for example, $CeO_2$, $Sb_2O_3$, S, and/or $Cl^-$ (from NaCl or the like). When a fining agent is present in the glass composition, the fining agent may be present in an amount less than or equal to about 1 mol. % or even less than or equal to about 0.4 mol. %. For example, in some embodiments the glass composition may include $Sb_2O_3$ as a fining agent. In these embodiments $Sb_2O_3$ may be present in the glass composition in an amount greater than about 0 mol. % and less than or equal to about 1 mol. % or even an amount greater than or equal to about 0.01 mol. % and less than or equal to about 0.30 mol. %.

Moreover, the glass compositions described herein may comprise one or more additional metal oxides to further improve the chemical durability of the glass composition. For example, the glass composition may further include $ZrO_2$, which further improves the resistance of the glass composition to chemical attack. In these embodiments, the additional metal oxide may be present in an amount which is greater than or equal to about 0 mol. % and less than or equal to about 4.5 mol. %. When the additional metal oxide is $ZrO_2$, the $ZrO_2$ may be present in an amount less than or equal to about 2.5 mol. %.

As noted above, the presence of alkali oxides and divalent metal oxides in the glass composition facilitates softening of the glass. In various embodiments, the glass composition has a softening point of less than or equal to about 650° C., less than or equal to about 615° C., or less than or equal to about 600° C.

In various embodiments, the glass composition has a liquidus viscosity of at least 90 kilopoise (kP). In other embodiments, the liquidus viscosity is at least 95 kP, at least 100 kP, at least 150 kP, at least 200 kP, at least 250 kP, at least 300 kP, or even at least 1000 kP. This property permits the glass composition to be down-drawable; i.e., the glass is capable of being formed into sheets using down-draw methods such as, but not limited to, fusion draw and slot draw methods that are known to those skilled in the art. In particular, the high liquidus viscosity ensures that crystal growth on the isopipe does not occur during drawing.

Additionally, the glass compositions described herein generally have a liquidus temperature of less than or equal to about 800° C. For example, the glass composition may have a liquidus temperature of from about 600° C. to about 800° C., from about 675° C. to about 780° C., from about 700° C. to about 775° C., or even from about 725° C. to about 750° C.

The glass compositions described herein generally have an annealing temperature $T_{anneal}$ of greater than about 465° C. or greater than about 470° C. For example, the glass composition may have an annealing temperature $T_{anneal}$ of from about 465° C. to about 500° C., or from about 470° C. to about 485° C.

In the embodiments described herein, the glass compositions have a CTE of less than about $90 \times 10^{-7} K^{-1}$ or even less than about $85 \times 10^{-7} K^{-1}$. For example, the glass composition may have a CTE of from about $75 \times 10^{-7} K^{-1}$ to about $90 \times 10^{-7} K^{-1}$, or from about $80 \times 10^{-7} K^{-1}$ to about $82 \times 10^{-7} K^{-1}$. These lower CTE values enable various processing technologies to be used when forming the glass. In particular, a high CTE may result in glass breakage when the glass is reheated and cooled.

The glass compositions described herein generally have a glass transition temperature $T_g$ of less than about 500° C. Additionally, in various embodiments, the glass compositions described herein have a temperature between 200 P and 35 kP viscosities of less than about 450° C. For example, the temperature between 200 P and 35 kP viscosities may be from about 300° C. to about 450° C., from about 350° C. to about 425° C., or from about 375° C. to about 400° C.

The glass compositions described herein also have an ISO 720 type HGA2 hydrolytic resistance. It should be understood that, when referring to the above referenced classifications according to ISO 720, a glass composition or glass article which has "at least" a specified classification means that the performance of the glass composition is as good as or better than the specified classification. For example, a glass article which has an ISO 720 hydrolytic resistance of "at least HGA2" may have an ISO 720 classification of either HGA2 or HGA1.

The glass compositions described herein are formed by mixing a batch of glass raw materials (e.g., powders of $SiO_2$, $Al_2O_3$, $B_2O_3$, alkali oxides, divalent metal oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard sheet forming techniques, such as overflow (fusion), slot draw, or floating, to shape the glass composition into a desired sheet form. Alternatively, the glass article may be shaped into any stock form, such as a tube or any other standard glass forming technique to form 3D shapes, and subsequently reheated and formed into the desired final form.

The glass compositions described herein may be shaped into glass articles having various forms such as, for example, sheets, tubes or the like. In some embodiments, molded glass sheets can be combined with flat sheets and sealed to form devices, which can reduce or eliminate stresses arising from varying thermal expansion.

EXAMPLES

The embodiments of the glass compositions described herein will be further clarified by the following examples.

Example 1

Twelve exemplary inventive glass compositions (compositions A-L) and seven comparative glass compositions (compositions 1-7) are shown. The specific compositions of each exemplary glass composition are reported below in Tables 1-3. Multiple samples of each exemplary glass composition were produced.

Annealing point was measured by the beam bending method. Density was measured using the Archimedes method in water. The CTE reported in Tables 1-3 is the average between 20° C. and 300° C. measured by dilatometry. The liquidus measurement was performed in a gradient furnace in a Pt boat with glass grains holding for 24 hours. The high temperature viscosity was measured using a rotational viscometer starting at about 200 P temperature and measuring a point approximately every 40° C.

Fulcher parameters (A, B, and $T_0$) were derived using the rotational viscometer points and low temperature data points from the beam bending viscosity, giving Fulcher parameters that are valid through the whole temperature range from $T_g$ and up. Softening point and liquidus viscosity for each of the glass compositions was calculated using the Fulcher parameters. All values are reported in Tables 1-3.

As shown in Tables 1 and 2, each of the inventive glass compositions has a softening point ($10^{7.6}$P) temperature below 650° C., a liquidus viscosity of greater than 90 kP, a temperature between 200 P and 35 kP viscosity of less than 450° C., and a CTE of $90 \times 10^{-7} K^{-1}$ or less. However, the comparative examples reported in Table 3 demonstrate what happens to the glass when going outside of the described composition range.

Specifically, Comparative Example 1 has high $SiO_2$ and low $B_2O_3$ content, leading to a high quartz liquidus temperature and a low liquidus viscosity. Comparative Example 2 has a combined MgO (mol. %)+CaO (mol. %)>6 with CaO (mol. %)>2 leading to diopside precipitation and a low liquidus viscosity. Comparative Example 3 has a high $Li_2O$ content with a combination of low $B_2O_3$ and $Al_2O_3$, leading to lithium silicate formation and low liquidus viscosity. Additionally, the high $Na_2O$ content coupled with the other modifiers gives a high CTE.

Comparative Example 4 has high $Al_2O_3$ with low boron, both increasing the softening point temperature, which becomes too high. Comparative Example 5 has high $K_2O$ and lacks $Al_2O_3$, which led to the formation of $KBSi_2O_6$, which precipitated out easily. In fact, very few data points were measured with the rotational viscometer, as the glass started to crystallize at so high of a temperature. Without being bound by theory, it is believed that the lack of $Al_2O_3$ drives the potassium to charge balance the tetrahedral boron so that the $KBSi_2O_6$ could be easily precipitated out.

Comparative Example 6 is similar to the composition of Comparative Example 5, with 5 mol. % $Al_2O_3$, which demonstrates that the high amount of $K_2O$ is the driving force for the precipitating phase, as $KAlSi_3O_8$ precipitates. Finally, Comparative Example 7 has high amounts of $Na_2O$ and $Al_2O_3$, leading to albite precipitating at high temperatures.

TABLE 1

Composition and Properties of Exemplary Glass Compositions

| | \multicolumn{6}{c|}{Composition in mole %} |
|---|---|---|---|---|---|---|
| | A | B | C | D | E | F |
| SiO$_2$ | 65.54 | 60.63 | 62.54 | 62.68 | 63.04 | 62.95 |
| Al$_2$O$_3$ | 4.05 | 7.06 | 7.01 | 5.00 | 3.00 | 5.03 |
| B$_2$O$_3$ | 9.87 | 10.21 | 6.98 | 8.95 | 10.68 | 6.40 |
| Li$_2$O | 5.02 | 9.93 | 8.78 | 8.78 | 8.69 | 8.84 |
| Na$_2$O | 5.90 | 6.29 | 8.90 | 8.83 | 8.85 | 8.99 |
| K$_2$O | 4.67 | 1.82 | 1.87 | 1.85 | 1.84 | 1.85 |
| MgO | 5.82 | 0.98 | 1.00 | 0.99 | 0.99 | 0.99 |
| CaO | 0.03 | 0.02 | 1.02 | 1.02 | 1.02 | 1.02 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 0.00 | 2.96 | 0.00 | 0.00 | 0.00 | 2.00 |
| ZrO$_2$ | 0.00 | 0.00 | 1.91 | 1.90 | 1.90 | 1.91 |
| T$_{anneal}$ (° C.) | 493.7 | 472.9 | 484.7 | 481.2 | 484.1 | 479 |
| Density | 2.439 | 2.472 | 2.5 | 2.505 | 2.511 | 2.543 |
| CTE × 10$^{-7}$ (1/K) | 80.1 | 78.3 | 88.3 | 88.3 | 88.9 | 88.1 |
| Liquidus (° C.) | 780 | 770 | 800 | 745 | 645 | 760 |
| Liquidus Phase | Na/K solid solution feldspar | Na/K solid solution feldspar | Albite | Albite | Lithium silicate | Albite |
| A | −0.7282 | −0.4772 | −0.9378 | −1.1164 | −1.1460 | −1.1252 |
| B | 3145.17 | 2616.07 | 3266.57 | 3183.48 | 2834.1 | 3265.12 |
| T$_0$ | 267.89 | 290.46 | 253.18 | 258.63 | 295.64 | 250.72 |
| T(200 P) (° C.) | 1306 | 1232 | 1262 | 1190 | 1118 | 1204 |
| T(35 kP) (° C.) | 864 | 811 | 849 | 821 | 794 | 827 |
| ΔT (200 P-35 kP) (° C.) | 442 | 421 | 413 | 369 | 324 | 377 |
| T$_{soft}$ (10$^{7.6}$ P) (° C.) | 646 | 614 | 636 | 624 | 620 | 625 |
| Liquidus viscosity | 259 kP | 95 kP | 109 kP | 269 kP | 9303 kP | 193 kP |

TABLE 2

Composition and Properties of Exemplary Glass Compositions

| | \multicolumn{6}{c|}{Composition in mole %} |
|---|---|---|---|---|---|---|
| | G | H | I | J | K | L |
| SiO$_2$ | 62.81 | 64.75 | 64.43 | 64.08 | 66.28 | 63.04 |
| Al$_2$O$_3$ | 3.00 | 4.72 | 4.72 | 4.72 | 3.51 | 5.04 |
| B$_2$O$_3$ | 6.72 | 8.30 | 8.46 | 8.86 | 7.46 | 9.89 |
| Li$_2$O | 8.79 | 10.35 | 10.49 | 9.48 | 10.27 | 9.86 |
| Na$_2$O | 8.99 | 6.08 | 6.10 | 6.02 | 5.95 | 6.42 |
| K$_2$O | 1.84 | 1.51 | 1.50 | 2.16 | 1.54 | 2.03 |
| MgO | 0.99 | 0.96 | 0.00 | 0.75 | 1.15 | 0.93 |
| CaO | 1.01 | 0.01 | 0.01 | 0.01 | 0.01 | 0.01 |
| SrO | 0.00 | 0.00 | 0.00 | 1.00 | 0.00 | 0.00 |
| BaO | 0.00 | 0.12 | 0.00 | 0.00 | 0.00 | 0.00 |
| ZnO | 3.97 | 3.19 | 4.27 | 2.89 | 3.82 | 2.76 |
| ZrO$_2$ | 1.88 | 0.00 | 0.00 | 0.00 | 0.00 | 0.00 |
| T$_{anneal}$ (° C.) | 472.3 | 472.6 | 468.9 | 475.4 | 469.5 | 475 |
| Density | 2.587 | 2.478 | 2.49 | 2.497 | 2.484 | 2.474 |
| CTE × 10$^{-7}$ (1/K) | 90.4 | 81.6 | 81.2 | 81.8 | 81.4 | 77.8 |
| Liquidus (° C.) | 690 | 725 | 730 | 745 | 780 | 755 |
| Liquidus Phase | Lithium silicate | Albite | Na/K feldspar | Na/K feldspar | Li$_2$SiO$_3$ Na$_2$Si$_3$O$_7$ SiO$_2$ | Na/K feldspar |
| A | −1.1268 | −0.7558 | | | −0.9461 | −0.9178 |
| B | 3020.96 | 2798.10 | | | 3090.01 | 2883.50 |
| T$_0$ | 269.60 | 277.94 | | | 256.36 | 268.47 |
| T(200 P) (° C.) | 1151 | 1193 | | | 1208 | 1164 |
| T(35 kP) (° C.) | 802 | 806 | | | 819 | 796 |

TABLE 2-continued

Composition and Properties of Exemplary Glass Compositions

| | Composition in mole % | | | | | |
|---|---|---|---|---|---|---|
| | G | H | I | J | K | L |
| ΔT (200 P-35 kP) (° C.) | 349 | 387 | | | 389 | 368 |
| $T_{soft}$ ($10^{7.6}$ P) (° C.) | 616 | 613 | | | 618 | 607 |
| Liquidus viscosity | 1146 kP | 319 kP | | | 90 kP | 102 kP |

TABLE 3

Composition and Properties of Comparative Glass Compositions

| | Composition in mole % | | | | | | |
|---|---|---|---|---|---|---|---|
| | Comp. Ex. 1 | Comp. Ex. 2 | Comp. Ex. 3 | Comp. Ex. 4 | Comp. Ex. 5 | Comp. Ex. 6 | Comp. Ex. 7 |
| $SiO_2$ | 71.66 | 63.86 | 62.78 | 64.58 | 64.46 | 61.18 | 64.72 |
| $Al_2O_3$ | 1.00 | 3.03 | 4.01 | 7.79 | 0 | 5.02 | 6.36 |
| $B_2O_3$ | 4.79 | 10.40 | 6.73 | 3.96 | 9.74 | 9.34 | 6.09 |
| $Li_2O$ | 10.85 | 5.92 | 10.77 | 8.65 | 10.07 | 9.53 | 7.04 |
| $Na_2O$ | 0.07 | 4.62 | 8.9 | 9.79 | 0.1 | 0.11 | 13.08 |
| $K_2O$ | 5.54 | 4.99 | 1.85 | 1.30 | 6.23 | 6.02 | 0.01 |
| MgO | 0.05 | 4.69 | 2.03 | 1.60 | 5.51 | 5.22 | 0.00 |
| CaO | 2.01 | 2.50 | 1.02 | 0.70 | 0.03 | 0.04 | 0.00 |
| SrO | 0.05 | 0.00 | 0.00 | 0.00 | 0.09 | 0.09 | 0.00 |
| BaO | 2.00 | 0.00 | 0.00 | 0.00 | 3.65 | 3.44 | 0.00 |
| ZnO | 1.98 | 0.00 | 0.00 | 0.00 | 0.00 | 0.00 | 2.56 |
| $ZrO_2$ | 0.00 | 0.00 | 1.90 | 1.60 | 0.00 | 0.00 | 0.00 |
| $T_{anneal}$ (° C.) | 490.3 | 492.1 | 469 | 491.2 | 496.1 | 496.8 | 479.4 |
| Density | 2.526 | 2.455 | 2.515 | 2.485 | 2.587 | 2.556 | 2.501 |
| CTE × $10^{-7}$ (1/K) | 82.4 | 83.3 | 94 | 84 | 84.6 | 80.2 | 88 |
| Liquidus (° C.) | 885 | 825 | 805 | 810 | 905 | 885 | 840 |
| Liquidus Phase | Quartz, cristobalite | Diopside, $CaMgSi_2O_6$ | Lithium silicate | | $KBSi_2O_6$ | $KAlSi_3O_8$ | Albite, $NaAlSi_3O_8$ |
| A | −0.89902 | −0.98453 | −1.09338 | −1.1 | −3.71596 | −0.9502 | −0.8992 |
| B | 3130.816 | 2973.614 | 3042.758 | 3907.5 | 5479.52 | 2896.92 | 2795.55 |
| $T_0$ | 268.6483 | 282.5443 | 255.9367 | 221.5 | 173.6012 | 291914 | 290.636 |
| T(200 P) (° C.) | 1247 | 1188 | 1152 | 1370 | 1084 | 1183 | 1154 |
| T(35 kP) (° C.) | 844 | 820 | 796 | 914 | 837 | 819 | 794 |
| ΔT (200 P-35 kP) (° C.) | 403 | 367 | 357 | 457 | 247 | 364 | 360 |
| $T_{soft}$ ($10^{7.6}$ P) (° C.) | 637 | 629 | 601 | 660 | 658 | 631 | 610 |
| Liquidus viscosity | 15 kP | 31 kP | 28 kP | 347 kP | 6 kP | 9 kP | 27 kP |

It should now be understood that the glass compositions described herein exhibit low softening points while maintaining a CTE below 90×10⁻⁷K⁻¹. These properties make the glass compositions well suited for use in various applications including, without limitation, three-dimensionally formed glass articles.

Based on the foregoing, it should now be understood that various aspects of glass compositions and glass articles formed from glass compositions are disclosed. According to a first aspect, a glass composition may include: $SiO_2$ in a concentration of from about 60 mol. % to about 67 mol. %; $B_2O_3$ in a concentration of from about 6 mol. % to about 11 mol. %; $Li_2O$ in a concentration of from about 4.5 mol. % to about 11 mol. %; greater than about 2 mol. % RO, where RO are divalent metal oxides; and from about 14 mol. % to about 20 mol. % $R_2O$, where $R_2O$ are alkali metal oxides. The glass composition also includes $Al_2O_3$, $Na_2O$, and $K_2O$. The glass composition has a glass transition temperature $T_g$ of less than about 500° C. and an average coefficient of thermal expansion (CTE) of less than about 85×10⁻⁷K⁻¹ or even about 85×10⁻⁷K⁻¹ over a temperature range of from about 20° C. to about 300° C.

According to a second aspect, the glass composition of the first aspect has a softening point of less than about 650° C.

According to a third aspect, the glass composition of the first aspect has a softening point of less than about 600° C.

According to a fourth aspect, the glass composition of any of the first through third aspects has a liquidus viscosity of greater than about 90 kP.

According to a fifth aspect, the glass composition of any of the first through fourth aspects includes $Al_2O_3$ in an amount of from about 2.5 mol. % to about 7.5 mol. %.

According to a sixth aspect, the glass composition of any of the first through fifth aspects includes $Na_2O$ in an amount of from about 5 mol. % to about 9.4 mol. %.

According to a seventh aspect, the glass composition of any of the first through sixth aspects includes $K_2O$ in an amount of from about 1 mol. % to about 5 mol. %.

According to a eighth aspect, the glass composition of any of the first through seventh aspects, wherein $R_2O$ (mol. %)>$Al_2O_3$ (mol. %).

According to a ninth aspect, the glass composition of any of the first through eighth aspects, wherein 20 mol. %<[$R_2O$+RO] (mol. %)<28 mol. %.

In an tenth aspect, a glass composition comprises from about 60 mol. % to about 67 mol. % $SiO_2$; from about 6 mol. % to about 11 mol. % $B_2O_3$; from about 4.5 mol. % to about 11 mol. % $Li_2O$; $Al_2O_3$; from about 5 mol. % to about 9.4 mol. % $Na_2O$; $K_2O$; from about 0 mol. % to about 1.5 mol. % CaO; from about 0 mol. % to about 6 mol. % MgO; from about 0 mol. % to about 2 mol. % SrO; from about 0 mol. % to about 2 mol. % BaO; from about 0 mol. % to about 4.5 mol. % ZnO. The glass composition comprises greater than about 2 mol. % RO, where RO are divalent metal oxides; $R_2O$ is from about 14 mol. % to about 20 mol. %, where $R_2O$ are alkali metal oxides; and the glass composition has an average coefficient of thermal expansion (CTE) of less than about $85 \times 10^{-7} K^{-1}$.

In an eleventh aspect, the glass composition the tenth aspect has a softening point of less than about 650° C.

In a twelfth aspect, the glass composition of the tenth aspect has a softening point of less than about 600° C.

In a thirteenth aspect, the glass composition of any of the tenth through twelfth aspects has a liquidus viscosity of greater than about 90 kP.

In a fourteenth aspect, the glass composition of any of the tenth through thirteenth aspects includes $Al_2O_3$ in an amount of from about 2.5 mol. % to about 7.5 mol. %.

In a fifteenth aspect, the glass composition of any of the tenth through fourteenth aspects includes $K_2O$ in an amount of from about 1 mol. % to about 5 mol. %.

In a sixteenth aspect, the glass composition of any of the tenth through fifteenth aspects, wherein $R_2O$ (mol. %)>$Al_2O_3$ (mol. %).

In a seventeenth aspect, the glass composition of any of the tenth through sixteenth aspects, wherein 20 mol. %<[$R_2O$+RO] (mol. %)<28 mol. %.

In an eighteenth aspect, a glass composition comprises: from about 60 mol. % to about 67 mol. % $SiO_2$; from about 6 mol. % to about 11 mol. % $B_2O_3$; from about 4.5 mol. % to about 11 mol. % $Li_2O$; from about 2.5 mol. % to about 7.5 mol. % $Al_2O_3$; from about 5 mol. % to about 9.4 mol. % $Na_2O$; from about 1 mol. % to about 5 mol. % $K_2O$; from about 0 mol. % to about 1.5 mol. % CaO; from about 0 mol. % to about 6 mol. % MgO; from about 0 mol. % to about 2 mol. % SrO; from about 0 mol. % to about 2 mol. % BaO; from about 0 mol. % to about 4.5 mol. % ZnO. The glass composition comprises greater than about 2 mol. % RO, where RO are divalent metal oxides, including ZnO; $R_2O$ is from about 14 mol. % to about 20 mol. %, where $R_2O$ are alkali metal oxides. Additionally, the glass composition has a softening point of less than about 650° C., a liquidus viscosity of greater than about 90 kP, and an average coefficient of thermal expansion (CTE) of less than about $85 \times 10^{-7} K^{-1}$.

In a nineteenth aspect, the glass composition of any of the above aspects has a temperature between 200 P and 35 kP viscosity of less than about 450° C.

In a twentieth aspect, the glass composition of any of the above aspects has a temperature between 200 P and 35 kP viscosity of from about 375° C. to about 400° C.

In a twenty-first aspect, the glass composition of any of the above aspects has a CTE of from about $80 \times 10^{-7} K^{-1}$ to about $82 \times 10^{-7} K^{-1}$.

In a twenty-second aspect, the glass composition of any of the above aspects has an annealing temperature of from about 465° C. to about 500° C.

In a twenty-third aspect, the glass composition of any of the above aspects has a liquidus temperature of from about 600° C. to about 800° C.

In a twenty-fourth aspect, the glass composition of any of the above aspects has a liquidus temperature of from about 725° C. to about 750° C.

In a twenty-fifth aspect, the glass composition of any of the above aspects has a liquidus viscosity of at least 100 kP.

In a twenty-sixth aspect, the glass composition of any of the above aspects has a liquidus viscosity of at least 300 kP.

In a twenty-seventh aspect, the glass composition of any of the above aspects has a softening point of less than or equal to about 615° C.

In a twenty-eighth aspect, the glass composition of any of the above aspects has a total amount (mol. %) of MgO and CaO of less than or equal to about 6 mol. %.

In a twenty-ninth aspect, the glass composition of any of the above aspects has a total amount (mol. %) of MgO and CaO from about 0.9 mol. % to about 2.1 mol. %.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 60 mol. % to about 67 mol. % $SiO_2$;
   from about 6 mol. % to about 11 mol. % $B_2O_3$;
   from about 4.5 mol. % to about 11 mol. % $Li_2O$;
   $Al_2O_3$;
   from about 5 mol. % to about 9.4 mol. % $Na_2O$;
   $K_2O$;
   from about 0 mol. % to about 1.5 mol. % CaO;
   from about 0 mol. % to about 6 mol. % MgO;
   from about 0 mol. % to about 2 mol. % SrO;
   from about 0 mol. % to about 2 mol. % BaO;
   from about 0 mol. % to about 4.5 mol. % ZnO;
   wherein:
   the glass composition comprises greater than about 2 mol. % RO, where RO are divalent metal oxides;
   $R_2O$ is from about 14 mol. % to about 20 mol. %, where $R_2O$ are alkali metal oxides;
   the glass composition has an average coefficient of thermal expansion (CTE) of less than about $85 \times 10^{-7} K^{-1}$; and
   the glass composition has a softening point of less than about 650° C.

2. The glass composition of claim 1, wherein the glass composition has a softening point of less than about 600° C.

3. The glass composition of claim 1, wherein the glass composition has a liquidus viscosity of greater than about 90 kP.

4. The glass composition of claim 1, wherein $Al_2O_3$ is present in an amount of from about 2.5 mol. % to about 7.5 mol. %.

5. The glass composition of claim 1, wherein $K_2O$ is present in an amount of from about 1 mol. % to about 5 mol. %.

6. The glass composition of claim 1, wherein $R_2O$ (mol. %)>$Al_2O_3$ (mol. %).

7. The glass composition of claim 1, wherein 20 mol. %<[$R_2O$+RO] (mol. %)<28 mol. %.

8. A glass composition comprising:
from about 60 mol. % to about 67 mol. % $SiO_2$;
from about 6 mol. % to about 11 mol. % $B_2O_3$;
from about 4.5 mol. % to about 11 mol. % $Li_2O$;
from about 2.5 mol. % to about 7.5 mol. % $Al_2O_3$;
from about 5 mol. % to about 9.4 mol. % $Na_2O$;
from about 1 mol. % to about 5 mol. % $K_2O$;
from about 0 mol. % to about 1.5 mol. % CaO;
from about 0 mol. % to about 6 mol. % MgO;
from about 0 mol. % to about 2 mol. % SrO;
from about 0 mol. % to about 2 mol. % BaO;
from about 0 mol. % to about 4.5 mol. % ZnO;
wherein:
the glass composition comprises greater than about 2 mol. % RO, where RO are divalent metal oxides;
$R_2O$ is from about 14 mol. % to about 20 mol. %, where $R_2O$ are alkali metal oxides;
the glass composition has a softening point of less than about 650° C., a liquidus viscosity of greater than about 90 kP, and an average coefficient of thermal expansion (CTE) of less than about $90 \times 10^{-7} K^{-1}$.

9. The glass composition of claim 8, wherein the glass composition has an average coefficient of thermal expansion (CTE) of less than about $85 \times 10^{-7} K^{-1}$.

10. The glass composition of claim 8, wherein the glass composition comprises greater than about 2 mol. % RO, where RO are divalent metal oxides.

* * * * *